Patented Feb. 14, 1950

2,497,553

UNITED STATES PATENT OFFICE 2,497,553

BUTENOL ALKANOL AMINES

Merton W. Long, Jr., Midland, Mich., assignor to The Dow Chemical Company, Midland, Mich., a corporation of Delaware No Drawing. Application October 16, 1948, Serial No. 55,020

8 Claims. (Cl. 260—584)

This invention relates to certain new amino-alcohols containing at least one 3-buten-2-ol radical.

The new compounds of the invention may be defined as hydroxyaliphatic monoamines having attached to the nitrogen atom thereof a 3-buten-2-ol radical, a 2-hydroxyalkyl radical containing from two to three carbon atoms, and, as the third substituent, hydrogen or one of the foregoing radicals. They are all stable colorless or yellowish clear liquids of high boiling point. All are sufficiently basic to be titratable to a methyl red endpoint with normal hydrochloric acid. They are useful in the manufacture of emulsifying agents, as corrosion inhibitors, and to some degree, as stabilizing agents for synthetic resins. By virtue of the unsaturated aliphatic radical present, they are more readily oxidizable than most alkanolamines and under some conditions exhibit reducing or drying properties.

The new compounds are most conveniently prepared by the reaction of butadiene monoxide (3,4-epoxybutene-1) with an alkanolamine containing one or two 2-hydroxyalkyl radicals per molecule, each such radical having two or three carbon atoms. Depending on the final product desired, the alkanolamine reactant may be either a monoalkanolamine, i. e. monoethanolamine or monoisopropanolamine, or a dialkanolamine, i. e. diethanolamine, diisopropanolamine, or monoethanol-monoisopropanolamine (J. Org. Chem. 11, 288 (1946)).

In the reaction of butadiene monoxide with a monalkanolamine, one or two mols of the former may be used per mol of the latter, depending upon whether a di- or a tri-(hydroxaliphatic) amine is to be prepared. In the reaction with a dialkanolamine, approximately equimolecular proportions of the latter and of butadiene monoxide are used. In general, an excess of butadiene monoxide over the stoichiometric proportion is to be avoided, particularly in making tri-(hydroxyaliphatic) amines, in order to prevent over-reaction with formation of complex ethers.

According to a preferred procedure for making the new compounds, the butadiene monoxide is added gradually to the alkanolamine in a vessel provided with a reflux condenser and agitator. Since the reaction is slow at ordinary temperatures, the alkanolamine is first warmed to 50° to 60° C. Inasmuch as the reaction is highly exothermic, the butadiene monoxide should be added slowly. It may also be desirable to have artificial cooling available since in general the temperature should not exceed 100° C. if formation of undesirable byproducts is to be avoided. Temperatures of 60° to 85° C. are quite satisfactory.

The process is best carried out simply by mixing the two reactants in the absence of water or other diluents. However, such substances may usually be tolerated.

After the appropriate proportion of butadiene monoxide has been added to the alkanolamine, the mixture is retained at a reaction temperature until evolution of heat stops. The resulting material is then worked up, usually by rectification at reduced pressure, to separate the desired product.

The following examples will further illustrate the invention.

Example 1

A charge of 12.0 gram-mols of anhydrous monoethanolamine was placed in a reaction vessel provided with an agitator and reflux condenser and warmed to approximately 60° C. Butadiene monoxide, 7.8 gram-mols in all, was added slowly over a period of several hours, cooling being applied as needed to limit the temperature to below 85° C. Following addition of the butadiene monoxide the mixture was agitated for several hours more to insure completion of the reaction. The crude product, which was a colorless liquid, had a molecular weight of 99 as determined by titration. This product was separated into its components by rectification in a heated column at an absolute pressure of 1.0 mm. of mercury, and was thus found to contain 24.4% unreacted monoethanolamine, 56.6% monoethanol mono-3-buten-2-ol-amine, 18.3% monoethanol di-3-buten-2-ol-amine, and 0.7% high boiling residue.

The purified monoethanolmono-3-buten-2-ol-amine (1-(2-hydroxyethylamino)-3-buten-2-ol) ($C_6H_{13}NO_2$) was a colorless liquid having a specific gravity of 1.054 at 25°/25° C. and a refractive index of 1.4860 $n_D^{25°}$. Its vapor pressure at 125.5° C. was 2.5 mm. of mercury absolute and at 205.5° C. was 123.4 mm.

Example 2

Following the general procedure of Example 1, 15.2 gram-mols of butadiene monoxide was added slowly to 8.0 gram-mols of anhydrous monoethanolamine maintained at 60° to 85° C. The crude product had a molecular weight by analysis of 197. On fractional distillation at a pressure below 1.0 mm. of mercury absolute, the product was found to contain 86.5% by weight of monoethanol di-3-buten-2-ol-amine,(1,1'-(2-hydroxyethylimino)-di-3-buten-2-ol) ($C_{10}H_{19}NO_3$).

This purified material had a specific gravity of 1.060 at 25°/25° C. and a refractive index of 1.4946 $n_D^{25°}$. Its vapor pressure at 160.0° C. was 1.0 mm. of mercury absolute and at 225.1° C. was 34.9 mm.

*Example 3*

To a charge of 8.9 gram-mols of anhydrous diethanolamine there was added 8.03 gram-mols of butadiene monoxide according to the procedure of Example 1. The crude product had a molecular weight of 172. By rectification at a pressure of 1.0 mm. of mercury absolute the product was found to contain 93.8% of diethanol mono-3-buten-2-ol-amine,(1-(bis(2-hydroxyethyl)amino)-3-buten-2-ol) ($C_8H_{17}NO_3$).

This purified material had a specific gravity of 1.088 at 25/25° C. and a refractive index of 1.4900 $n_D^{25°}$. Its vapor pressure at 160.8° C. was 1.0 mm. of mercury absolute and at 239.4° C. was 49.8 mm.

*Example 4*

To a charge of 12.0 gram-mols of anhydrous mono-isopropanolamine, 7.8 gram-mols of butadiene monoxide was added slowly according to the procedure of Example 1. The molecular weight of the crude product was 120. On fractional distillation at an absolute pressure below 1.0 mm. of mercury, the product was found to contain 51.6% of mono-isopropanol-mono-3-buten-2-ol-amine,(1-(2-hydroxypropylamino)-3-buten-2-ol) ($C_7H_{15}NO_2$).

The purified material had a specific gravity of 1.016 at 25/25° C. and a refractive index of 1.4770 $n_D^{25°}$. The vapor pressure at 115.5° C. was 2.5 mm. of mercury absolute and at 207.0° C. was 154.3 mm.

*Example 5*

To a charge of 7 gram-mols of anhydrous mono-isopropanolamine, 14.6 gram mols of butadiene monoxide was added according to the procedure of Example 1. The molecular weight of the crude product was 229. On fractional distillation at an absolute pressure below 1.0 mm. of mercury, the product was found to contain 86.3% of monoisopropanol di-3-buten-2-ol-amine,(1,1'-(2-hydroxypropylimino)-di-3-buten-2-ol) ($C_{11}H_{21}NO_3$).

The purified material had a specific gravity of 1.033 at 25/25° C. and a refractive index of 1.4870 $n_D^{25°}$. The vapor pressure at 165.5° C. was 3.0 mm. of mercury absolute and at 245.0° C. was 116.4 mm.

*Example 6*

To a charge of 8 gram-mols of anhydrous diisopropanolamine, 7.2 gram-mols of butadiene monoxide was added according to the procedure of Example 1. The molecular weight of the crude product was 196. On fractional distillation at an absolute pressure below 1.0 mm. of mercury, the product was found to contain 90.0% of diisopropanol mono-3-buten-2-ol-amine, (1-(bis(2-hydroxyethyl)-amino)-3-buten-2-ol) ($C_{10}H_{21}NO_3$).

The purified material had a specific gravity of 1.027 at 25/25° C. and a refractive index of 1.4771 $n_D^{25°}$. The vapor pressure at 147.4° C. was 1.0 mm. of mercury absolute and at 237.1° C. was 93.8 mm.

*Example 7*

To a charge of 7 mol-grams of anhydrous monoethanol monoisopropanolamine, 6.65 gram-mols of butadiene monoxide was added according to the procedure of Example 1. The molecular weight of the crude product was 189. On fractional distillation at an absolute pressure below 1.0 mm. of mercury, the product was found to contain 94.4% of monoethanol monoisopropanol mono-3-buten-2-ol-amine, (1-N-(2-hydroxyethyl)-N-(2-hydroxypropyl)amino-3-buten-2-ol) ($C_9H_{19}NO_3$).

The purified material had a specific gravity of 1.053 at 25/25° C. and a refractive index of 1.4816 $n_D^{25°}$. The vapor pressure at 149.0° C. was 1.0 mm. of mercury absolute and at 247.0° C. was 100.6 mm.

What is claimed is:

1. A hydroxyaliphatic monoamine having attached to the nitrogen atom thereof as the sole organic substituents thereon not more than three radicals consisting of from one to two 3-buten-2-ol radicals and from one to two 2-hydroxyalkyl radicals each containing from two to three carbon atoms.

2. A compound according to claim 1 containing one 3-buten-2-ol radical.

3. A compound according to claim 1 containing two 3-buten-2-ol radicals.

4. Diethanol mono-3-buten-2-ol-amine, a liquid having a boiling point of about 161° C. at 1.0 mm. of mercury absolute pressure and a specific gravity of about 1.088.

5. Diisopropanol mono-3-buten-2-ol-amine, a liquid having a boiling point of about 147° C. at 1.0 mm. of mercury absolute pressure and a specific gravity of about 1.027.

6. Monoethanol monoisopropanol mono-3-buten-2-ol-amine, a liquid having a boiling point of about 149° C. at 1.0 mm. of mercury absolute pressure and a specific gravity of about 1.053.

7. Monoethanol mono-3-buten-2-ol-amine, a liquid having a boiling point of about 125° C. at 2.5 mm. of mercury absolute pressure and a specific gravity of about 1.054.

8. Monoisopropanol mono-3-buten-2-ol-amine, a liquid having a boiling point of about 115° C. at 2.5 mm. of mercury absolute pressure and a specific gravity of about 1.016.

MERTON W. LONG, JR.

REFERENCES CITED

The following references are of record in the file of this patent:

UNITED STATES PATENTS

| Number | Name | Date |
|---|---|---|
| 2,119,802 | Westphal et al. | June 7, 1938 |
| 2,198,260 | Van Melson | Apr. 23, 1940 |
| 2,404,691 | Christainsen et al. | July 23, 1946 |